No. 852,269. PATENTED APR. 30, 1907.
H. A. GRANT.
MACHINE FOR RAKING AND COCKING HAY.
APPLICATION FILED APR. 12, 1905.
4 SHEETS—SHEET 1.
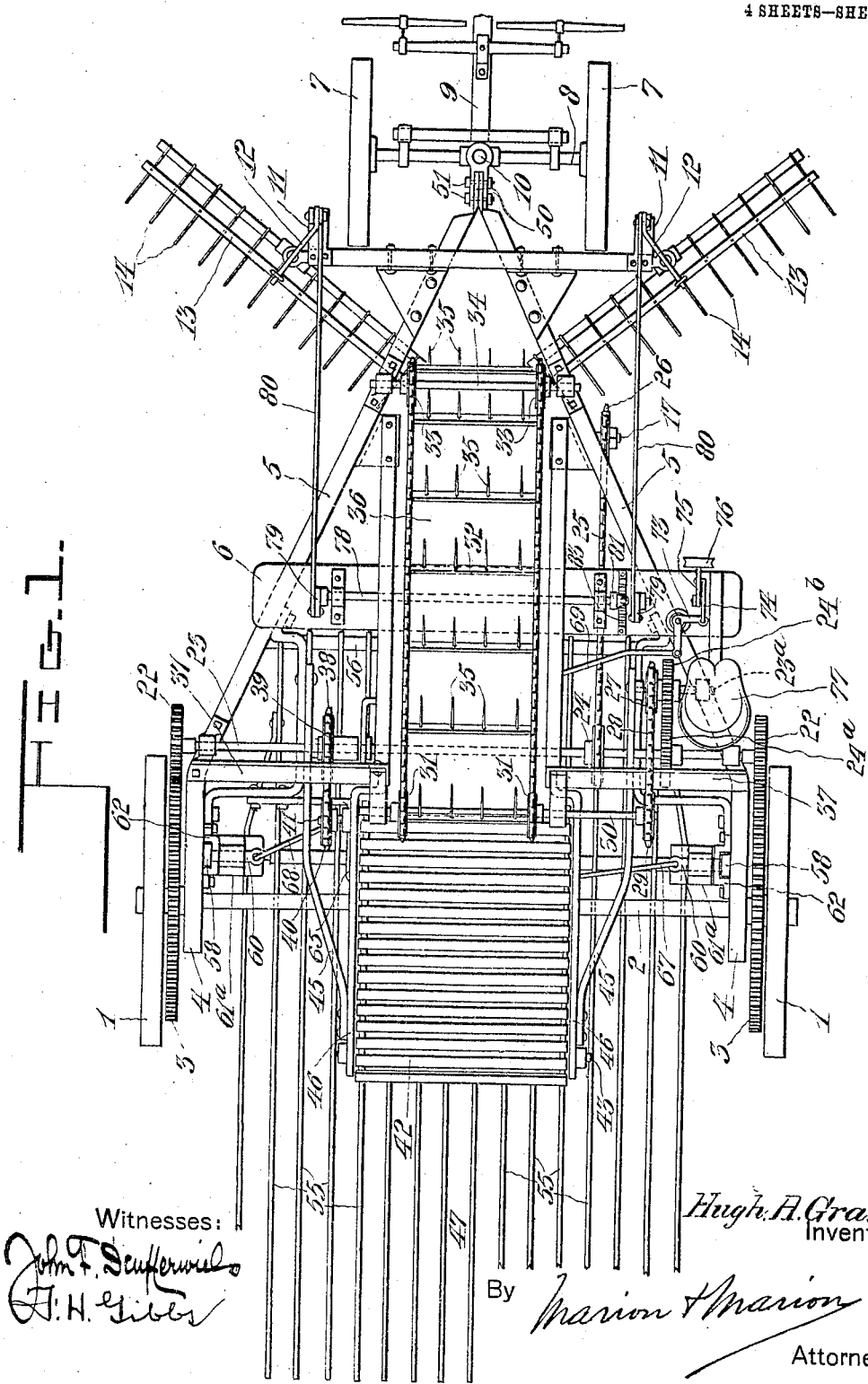
Witnesses:
Hugh A. Grant,
Inventor,
By Marion & Marion
Attorneys No. 852,269. PATENTED APR. 30, 1907.
H. A. GRANT.
MACHINE FOR RAKING AND COCKING HAY.
APPLICATION FILED APR. 12, 1905.
4 SHEETS—SHEET 2.
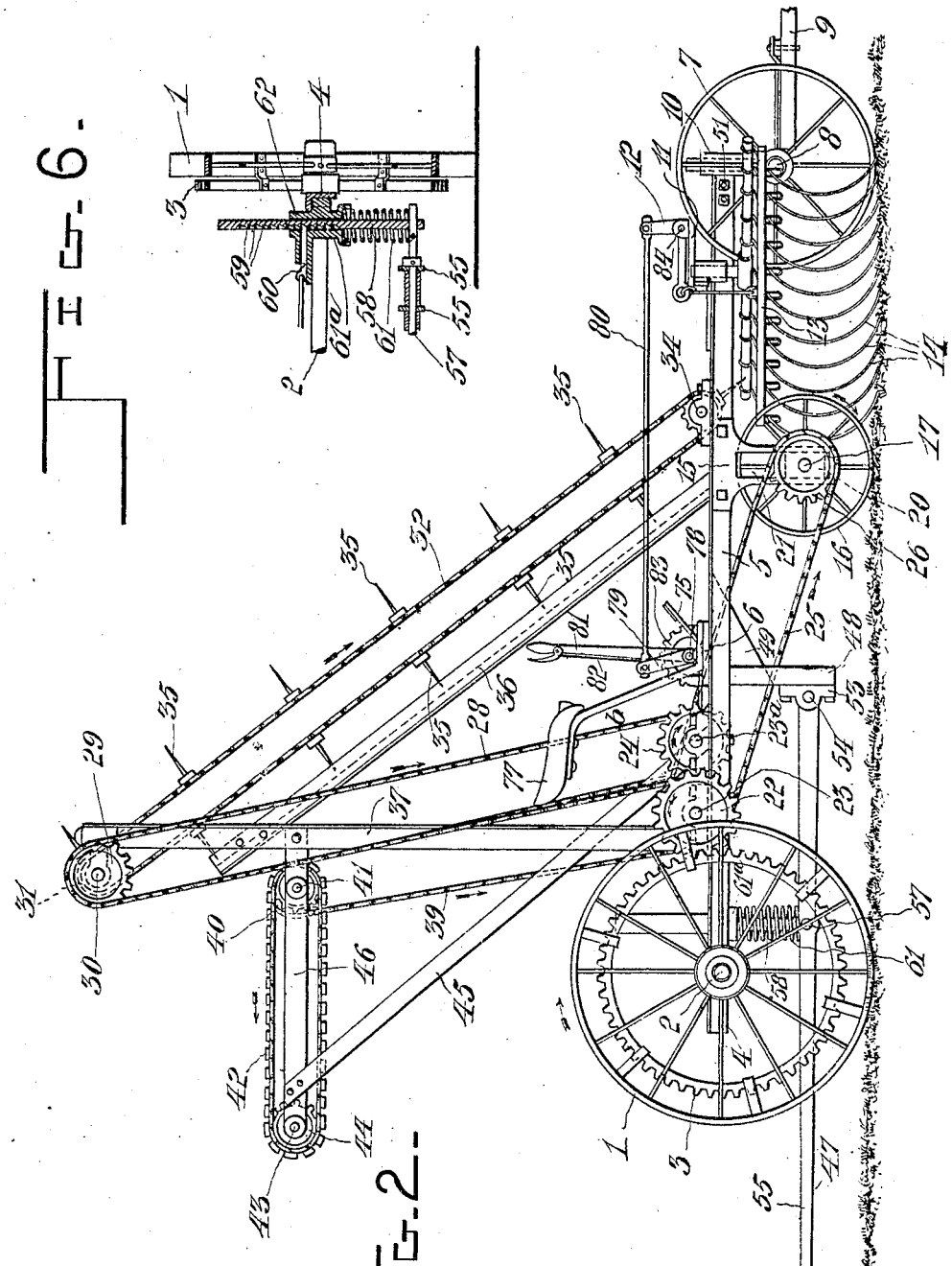
Witnesses:
Hugh A. Grant, Inventor,
By
Attorneys No. 852,269.
PATENTED APR. 30, 1907.
H. A. GRANT.
MACHINE FOR RAKING AND COCKING HAY.
APPLICATION FILED APR. 12, 1905.
4 SHEETS—SHEET 3.
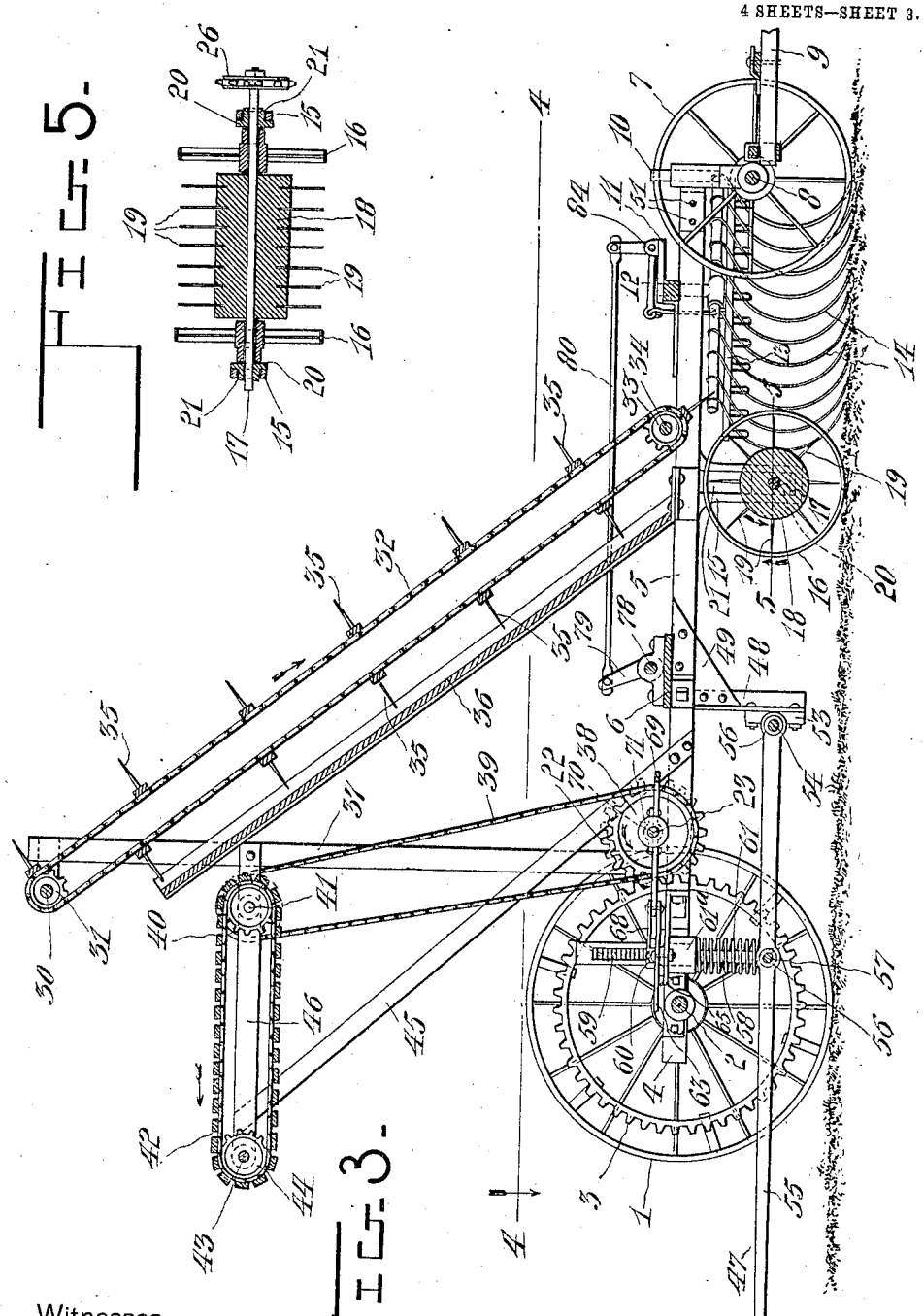
Witnesses:
Inventor,
Hugh A. Grant,
By Marion & Marion
Attorneys

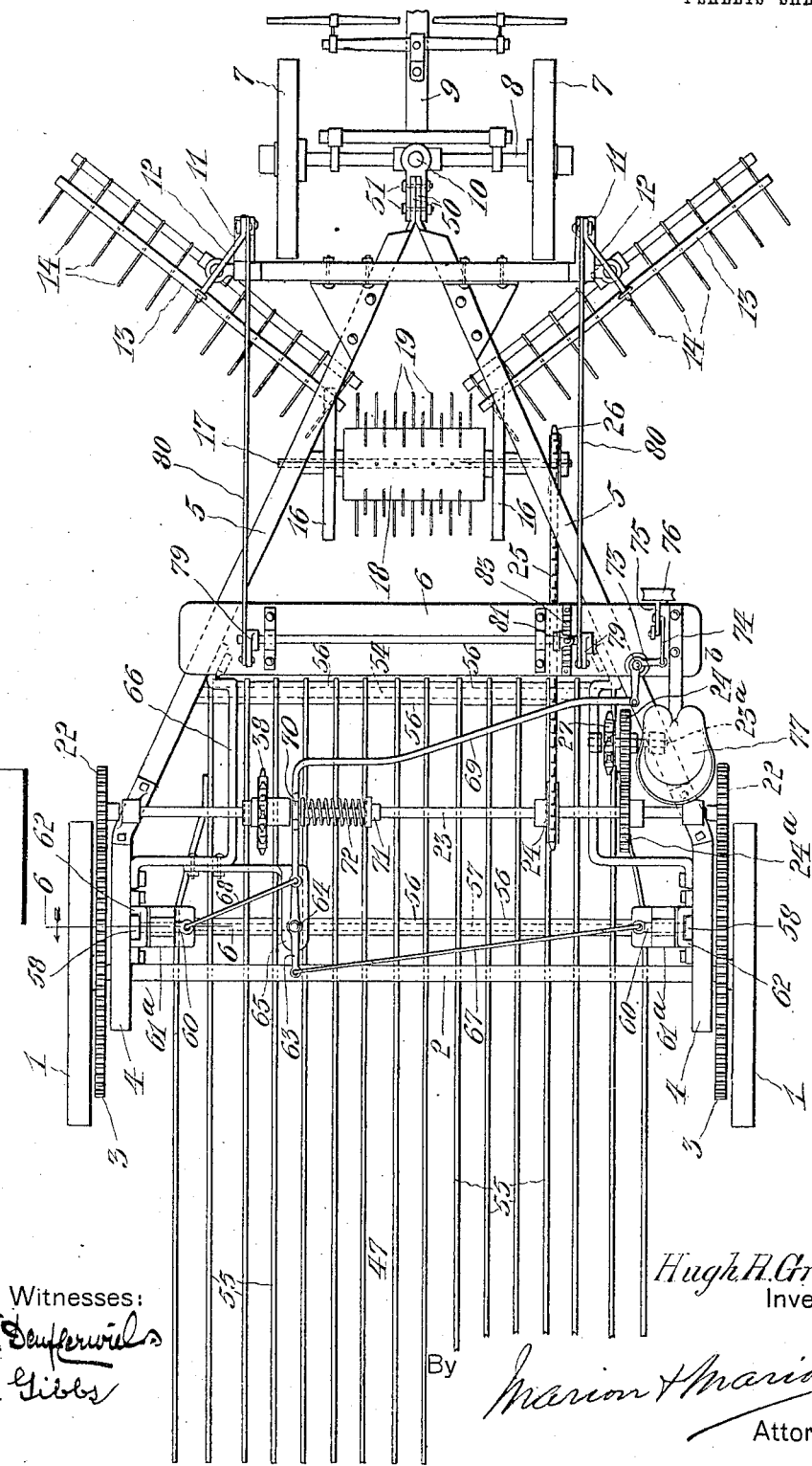

UNITED STATES PATENT OFFICE.

HUGH ALBERT GRANT, OF COMOX, BRITISH COLUMBIA, CANADA.

MACHINE FOR RAKING AND COCKING HAY.

No. 852,269.  Specification of Letters Patent.  Patented April 30, 1907.

Application filed April 12, 1905. Serial No. 255,139.

*To all whom it may concern:*

Be it known that I, HUGH ALBERT GRANT, a subject of the King of England, residing at Comox, county of Vancouver, Province of British Columbia, Canada, have invented certain new and useful Improvements in Machines for Raking and Cocking Hay; and I do hereby declare that the following is a full, clear, and exact description of the invention, such as will enable others skilled in the art to which it appertains to make and use the same.

This invention relates to new and useful improvements in machines for raking and cocking hay, and consists in certain features of novelty in the construction and arrangement thereof, all as hereinafter more fully described and specifically pointed out in the claims.

The invention comprises means for raking hay and gathering it to a central point, where it is lifted by a picker to an elevator rising to a high plane, by which elevator the hay is deposited upon a suitable conveyer, which carries it in a rearward direction, where the hay is dropped onto a yieldingly supported platform, which is normally sustained in an elevated position and has locking means coöperating therewith, normally locking the platform in such elevated position; means for releasing the lock, and resilient restoring means adapted to elevate the platform from a lower position to its normal position of rest, together with certain actuating means for driving the mechanism connected therewith, all as hereinafter more fully described and specifically pointed out in the claims.

The object of the invention is to gather hay from a field after having been cut, and deposit it in suitable piles at convenient intervals, which piles may afterward be lifted onto a rack and conveyed to a suitable place of deposit for storage.

In the annexed drawings, in which similar numerals of reference indicate corresponding parts in all the views, Figure 1 is a plan view of the improved machine. Fig. 2 is a side elevational view. Fig. 3 is a central longitudinal section of the machine. Fig. 4 is a plan view of that portion of the machine below the line 4—4, shown in Fig. 3. Fig. 5 is a sectional view of the picker, taken on line 5—5 of Fig. 3, and Fig. 6 is a detail sectional view of the platform supporting means taken on the line 6—6 of Fig. 4 looking in the direction indicated by the arrow.

In the drawings, 1, 1 are suitable supporting wheels, which may be of the traction type or otherwise, as may be found most desirable, which wheels are carried on the axle 2, and each has connected therewith the rack gear 3, which serve as main driving gears for the operative parts of the machine. Mounted on the axle 2 is a supporting frame comprising the longitudinally extending arms 4, converging side bars 5, and transversely extending platform 6, and braces and connecting means therefor, which are suitably arranged to render the supporting frame suitable for the purpose intended. The forward end of the frame is supported by wheels 7, carried upon the axle 8, with which may be connected the draft tongue 9, which is pivotally connected at 10 with the supporting frame. Connected with the forwardly extending arm 11 of the supporting frame, are levers 12, which are connected with the cross bar 13, through which are disposed the rake teeth 14, which teeth diverge outwardly from the central longitudinal axis of the machine, as best shown in Figs. 1 and 4, so that as the machine is drawn forwardly, the material gathered by the rakes will be conducted by such rakes toward the longitudinal axis of the machine. Mounted upon brackets 15 are supporting wheels 16, provided with the shafts 17, on which such supporting wheels are loosely mounted, while keyed to such shaft is a picker cylinder 18, carrying the picker arms 19, which are adapted to lift the hay gathered by the rakes from the ground, and carry the same into the path of the elevator hereinafter described. To accommodate the picker and the wheels 16 to inequalities of the ground surface, they are mounted in bearings 20, which are slidable vertically in the longitudinal openings 21 in the brackets 15, the picker rising with the wheels 16, and being carried at the same relative distance from the ground at all times, and the weight of the chain 25 being sufficient to keep it tight enough for operating purposes. In mesh with the pinion racks 3 are pinions 22, upon the shaft 23, which shaft 23 serves as a driving shaft for the machine; sprocket wheels 24 on the shaft 23 carrying a chain 25, which engages with the sprocket wheels 26 upon the axle 17 carrying the picker before referred to, so that the picker is rotated in the direction of the arrow shown in Fig. 3, while the machine is traveling over the surface of the ground. On the shaft 23ª are other sprocket wheels 27, with which engages a chain 28, which extends around the sprocket wheel 29 mounted upon the shaft 30, which shaft 30 carries smaller sprockets 31, which serve as driving means for the elevator 32, sprocket wheels 33 on the shaft 34 serving as supporting and guiding means for the lower end of such elevator, and fingers 35 projecting from the elevator so as to engage the hay carried into the line of travel by the picker before referred to, while an inclined platform 36 serves as a slide, over the surface of which the hay is conducted by means of the elevator fingers referred to. Suitable supports, as 37, are provided for supporting the elevator and the platform in proper position. In engagement with sprocket wheels 38 is a chain 39, which engages the sprocket wheels 40 carried upon the shaft 41, and thereby serves as a driving means for the slatted conveyer 42, which is supported at its opposite end upon the shaft 43, by means of the sprocket 44, best shown in Figs. 2 and 3, braces 45 and 46 being provided, which serve as supporting means for such conveyer.

By the mechanism hereinbefore described, it will be evident that hay or grain may be gathered from the ground, and by means of the picker, elevator and conveyer, carried to any convenient place of deposit. In the present construction, however, it is intended that the hay or grain shall be deposited by the conveyer onto a platform 47, which is pivotally supported at its forward end in the downwardly extending brackets 48, which are held by the gusset plates 49 connected with the supporting frame of the machine, which, as will be noted, is formed of commercially rolled angle irons from which the horizontally disposed flanges are removed at the forward end 50, where the securing bolts 51 pass through the vertical flanges of the bars 5 and unite them together. Connected with the downwardly extending brackets 48 are bearings 53, in which is pivotally mounted the supporting shaft 54 for the yielding platform upon which hay or grain is to be deposited by the conveyer 42, such platform comprising a plurality of parallel or approximately parallel bars 55, which are properly spaced apart at convenient intervals by the sleeves 56, which are carried upon the shaft 54, and the parallel shaft 57, which is likewise connected with the platform bars 55. Connected with the shaft 57 is a vertically extended rod 58, which, as shown in the detail view Fig. 6, is provided at its upper portion with serrations or teeth 59, with which the slidable lock 60 is adapted to engage so as to hold said platform in an elevated position when desired, a spring 61 being connected with the platform, or with the shaft 57, at one end, and being connected with the spring seat 61$^a$ at its opposite end, and serving as a resilient means for raising the platform in the event of its being lowered from its normal position.

For the purpose of providing a suitable support for the rod 58, a locking means 60 and casting 62 is provided, which is shown in the sectional view Fig. 6, said casting having a vertically extended opening or passage therethrough, and having an approximately horizontal passage in which is seated the slidable locking member 60, said casting 62 being bolted or otherwise secured upon the bar 4 of the supporting frame before referred to. Coöperating with the sliding lock 60, which is duplicated upon the opposite side of the machine, is a lever 63, which is pivoted at 64 upon the supporting bracket 65, which extends inwardly from the said bar 4, as shown in Figs. 1 and 4, and is conveniently supported by the forwardly extending brace 66, which runs to one of the converging bars 5. Connected with the lever 63 at one end is a rod 67, which is pivotally connected with one of the slidable locks 60, and connected with the other end of said lever 63 is a short pivoted rod 68, connected with the other of said slidable locks. To provide means for rocking the lever 63 to release the locking means, a lever 69 is provided, which lever has a loop or yoke 70 slidable upon the shaft 23, and is provided with a stop collar 71, against which abuts the spring 72, which spring at the opposite end contacts with the yoke or loop 70 before referred to. Connected with the opposite end of the lever 69 is a bell crank lever 73, which is pivoted upon the plate 6, and has connected with its upper end the short lever 74, which is in turn connected with the rockable lever 75, which carries the foot rest 76. The levers and connections from 63 to 76 inclusive provide spring actuated rocking means for controlling the slidable lock 60, and by reason of the interposition of the spring 72, such means are always in position to cause the locks to engage with the ratchet teeth 59 before referred to, so that as the platform 47 is elevated, it will be evident that it will be locked in its uppermost position, and when desired, the lock may be released by pressing downwardly upon the foot rest 76. In the practical operation of the machine, the hay is deposited by the elevator 42 upon the platform bars 55, and in the discretion of the operator, who presumably occupies the seat 77, more or less of such hay is deposited upon the platform, until a sufficient quantity has been so deposited, whereupon the foot rest 76 will be depressed, and the weight of the hay deposited on the platform will cause a depression thereof to such an extent as to cause a frictional engagement of the hay with the ground, which will hold the hay and permit the machine to be drawn away from it, thereby leaving the hay piled upon the ground in stacks of the proper size. Immediately upon the weight of the hay being removed from the platform, the springs 60 will exert their function in raising the platform, and as soon as it is raised by the springs, the locking means before referred to will secure the platform in its uppermost position until again released by the operator, as before described.

Mounted upon the supporting frame is a shaft 78, rigidly connected with which are the levers 79 pivotally connected with the rods 80, which extends to the bell crank levers 12. Mounted also on the shaft 78 is the manipulating lever 81, provided with the engaging rod 82, adapted to lock in the segment 83, and by means of such lever and the rod 80, the bell crank lever 12 may be rocked upon its pivot 84 for the purpose of raising the rake teeth from the ground when desired.

The operation of the device is as follows:—
Draft animals or draft appliances are connected with the forward end of the machine, which is thereby propelled over the ground, whereupon, owing to the driving gear before referred to, the picker, elevator and conveyer will be actuated, and hay or grain projected toward the central line of the machine will be elevated from the ground by the picker and carried by the elevator to the conveyer, from which it will be deposited upon the yielding platform before referred to, and regardless of the size of the crop, it will be evident that the hay may be deposited upon the ground in piles of approximately uniform size at convenient intervals, all that is required being that the operator shall watch the quantity which is being deposited upon the platform and trip the support therefor at the proper time.

To cause the chain 28 to travel in the proper direction, the gear 24ª is mounted on the shaft 23 and meshes with the gear 24ᵇ on shaft 23ª, whereby the said chain and elevator are caused to travel in the direction indicated by the arrows in Fig. 2.

Having described my invention, what I claim and desire to secure by Letters Patent is:—

1. In an apparatus of the character described, a supporting frame, gathering means, elevating means, a platform, a rack extending upwardly from said platform, a lock normally in engagement with said rack, and means for raising said platform.

2. In an apparatus of the character described, a supporting frame, gathering means, elevating means, a conveyer, a platform, a rack extending upwardly from said platform, a lock normally in engagement with said rack, and means for raising said platform.

3. In an apparatus of the character described, a supporting frame, gathering means, elevating means, a support extending downwardly from said frame, a platform pivotally connected therewith, a ratchet bar connected with said platform intermediate the ends thereof, a lock normally in engagement with said bar, and yielding lifting means connected with said platform.

4. In an apparatus of the character described, a supporting shaft, actuating means connected therewith, a yieldingly mounted picker, an elevator, a pivoted platform, a lock therefor, and resilient restoring means connected with said platform.

5. In an apparatus of the character described, a supporting shaft, actuating means, rakes, a picker, an elevator, a pivoted platform, vertical supporting arms, a catch engaging said arms, a releasing means, and resilient restoring means connected with said platform.

6. In an apparatus of the character described, a main supporting frame, a bracket carried thereby, a pivoted platform carried by said bracket, supporting means intermediate the length of said platform, a lock therefor, and means for actuating in one direction said platform on its pivot.

In witness whereof I have hereunto set my hand in the presence of two witnesses.

HUGH ALBERT GRANT.

Witnesses:
   THOS. L. DAVIES,
   ROBT. WEBSTER.